US012621259B2

(12) United States Patent
Rosenbeck et al.

(10) Patent No.: US 12,621,259 B2
(45) Date of Patent: May 5, 2026

(54) INTELLIGENT DOMAIN NAME SERVICE (DNS) PRE-CACHE

(71) Applicant: Charter Communications Operating, LLC, St. Louis, MO (US)

(72) Inventors: Leonard Gerald Rosenbeck, Parker, CO (US); Stephen Christopher Opferman, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 18/784,399

(22) Filed: Jul. 25, 2024

(65) Prior Publication Data

US 2026/0032098 A1     Jan. 29, 2026

(51) Int. Cl.
*G06F 13/00* (2006.01)
*H04L 61/4511* (2022.01)
*H04L 61/5007* (2022.01)
*H04L 65/1069* (2022.01)

(52) U.S. Cl.
CPC ...... *H04L 61/4511* (2022.05); *H04L 61/5007* (2022.05); *H04L 65/1069* (2013.01)

(58) Field of Classification Search
CPC ............. H04L 61/4511; H04L 61/5007; H04L 65/1069

USPC ................................. 709/245, 220–222, 203
See application file for complete search history.

(56) References Cited

U.S. PATENT DOCUMENTS

| | | | | |
|---|---|---|---|---|
| 10,484,278 B2 * | 11/2019 | Lopez | | H04L 61/4511 |
| 10,931,561 B2 * | 2/2021 | Parla | | H04L 12/4641 |
| 11,134,127 B2 * | 9/2021 | Lee | | H04W 12/08 |
| 12,166,831 B2 * | 12/2024 | Lee | | H04L 67/52 |
| 2016/0277293 A1 * | 9/2016 | Lopez | | H04L 45/28 |
| 2018/0227229 A1 * | 8/2018 | Lopez | | H04L 45/28 |
| 2018/0309658 A1 * | 10/2018 | Parla | | H04L 12/4641 |
| 2020/0389531 A1 * | 12/2020 | Lee | | H04L 67/52 |

* cited by examiner

*Primary Examiner* — Kenneth R Coulter
(74) *Attorney, Agent, or Firm* — Dority & Manning, P.A.

(57) ABSTRACT

A gateway router is provisioned with network access by a service provider computing system associated with a service provider. The service provider computing system generates a domain name service (DNS) profile for a user of the gateway router based on customer profile data associated with the user. The DNS profile includes a predicted fully qualified domain name (FQDN). During an initialization process, the gateway router receives the DNS profile from the service provider computing system and stores the DNS profile in a DNS cache. Subsequently, the gateway router obtains an internet protocol (IP) address corresponding to the predicted FQDN in the DNS profile and stores the IP address in the DNS cache. Subsequently, the gateway router implements a local area network (LAN) and establishes connection to one or more client computing devices.

20 Claims, 9 Drawing Sheets

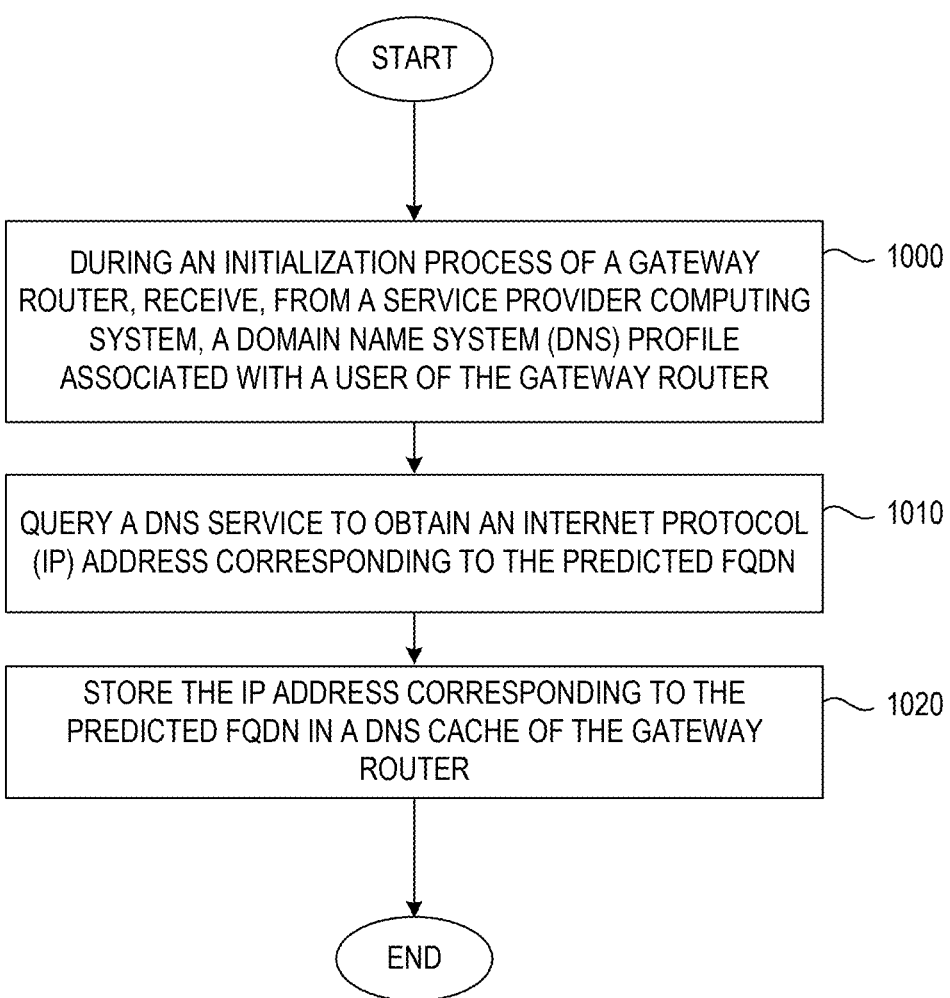

START

DURING AN INITIALIZATION PROCESS OF A GATEWAY ROUTER, RECEIVE, FROM A SERVICE PROVIDER COMPUTING SYSTEM, A DOMAIN NAME SYSTEM (DNS) PROFILE ASSOCIATED WITH A USER OF THE GATEWAY ROUTER — 1000

QUERY A DNS SERVICE TO OBTAIN AN INTERNET PROTOCOL (IP) ADDRESS CORRESPONDING TO THE PREDICTED FQDN — 1010

STORE THE IP ADDRESS CORRESPONDING TO THE PREDICTED FQDN IN A DNS CACHE OF THE GATEWAY ROUTER — 1020

END

*FIG. 4*

START

PROVISION A GATEWAY ROUTER ASSOCIATED WITH A USER; ⌇ 2000

DETERMINE A DOMAIN NAME SYSTEM (DNS) PROFILE FOR THE USER ASSOCIATED WITH THE GATEWAY ROUTER BASED ON CUSTOMER PROFILE DATA ASSOCIATED WITH THE USER ⌇ 2010

PROVIDE THE DNS PROFILE TO THE GATEWAY ROUTER ⌇ 2020

END

INTELLIGENT DOMAIN NAME SERVICE (DNS) PRE-CACHE

BACKGROUND

Internet Protocol (IP)-based networks are implemented with a wide variety of network devices, such as network infrastructure devices (e.g., network routers, network switches, etc.), user devices (e.g., smartphones, laptops, etc.), customer premises equipment (e.g., gateway routers, cable modems, etc.), and/or the like. Many of the largest wireless networks are implemented by network service providers, who use such networks to provision users with network services. A subscriber (e.g., user, customer, etc.) may obtain network access from the service provider. To provide the network access service, the service provider may install and/or provision a customer premises equipment (CPE) (e.g., a gateway router, a cable modem, etc.) at the customer's premises (e.g., home, business, etc.) that implements a local area network (LAN). In some examples, client devices (e.g., computers, mobile devices, smart appliances, etc.) may connect to the LAN, thereby obtaining internet services provided by the service provider.

SUMMARY

The examples disclosed herein pre-resolve domain name system (DNS) queries and store the corresponding internet protocol (IP) addresses in a DNS cache of a gateway router during an initialization process of the gateway router.

In one implementation, a method is provided. The method includes, during an initialization process of a gateway router, receiving, by the gateway router from a service provider computing system, a domain name system (DNS) profile associated with a user of the gateway router, the DNS profile comprising a predicted fully qualified domain name (FQDN), the predicted FQDN being determined based on customer profile data associated with the user. The method further includes querying, by the gateway router, a DNS service to obtain an internet protocol (IP) address corresponding to the predicted FQDN. The method further includes storing, by the gateway router, the IP address corresponding to the predicted FQDN in a DNS cache of the gateway router.

In another implementation, a gateway router is provided. The gateway router includes a memory and one or more processors. The one or more processors are operable to, during an initialization process, receive, from a service provider computing system, a domain name system (DNS) profile associated with a user of the gateway router, the DNS profile comprising a predicted fully qualified domain name (FQDN), the predicted FQDN being determined based on customer profile data associated with the user. The one or more processors are further operable to query a DNS service to obtain an internet protocol (IP) address corresponding to the predicted FQDN. The one or more processors are further operable to store the IP address corresponding to the predicted FQDN in the memory.

In another implementation, a method is provided. The method includes provisioning, by a service provider computing system comprising one or more computing devices, a gateway router associated with a user. The method further includes determining, by the service provider computing system, a domain name system (DNS) profile for the user associated with the gateway router based on customer profile data associated with the user, the DNS profile comprising a predicted fully qualified domain name (FQDN). The method further includes providing, by the service provider computing system, the DNS profile to the gateway router.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 4 is a flowchart of a method for pre-configuring a memory of a gateway router according to one implementation;

DETAILED DESCRIPTION

Figure 1:
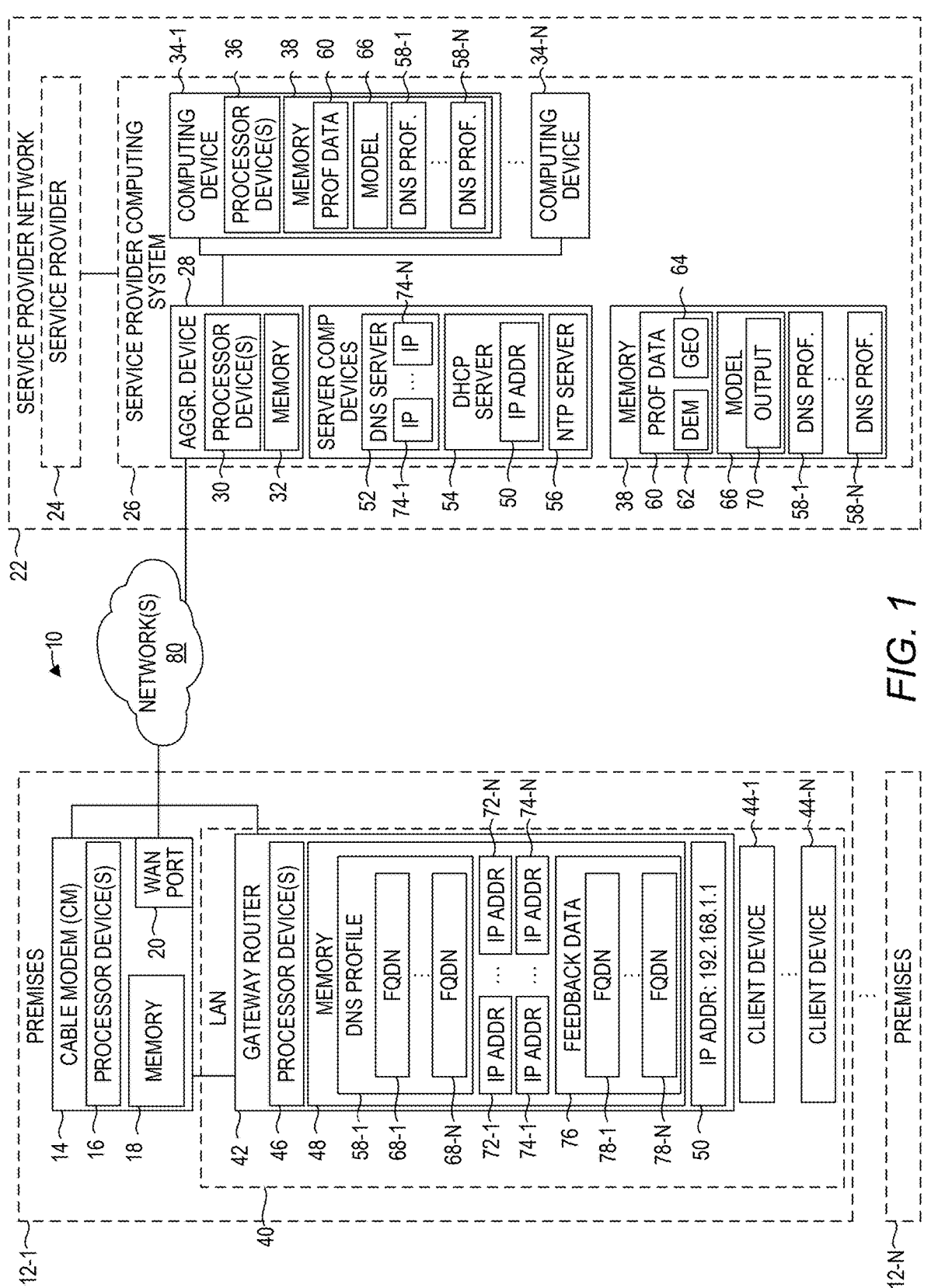
FIG. 1 is a block diagram suitable for dynamically upgrading a modem according to one implementation.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples and claims are not limited to any particular sequence or order of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

Internet Protocol (IP)-based networks are implemented with a wide variety of network devices, such as network infrastructure devices (e.g., network routers, network switches, etc.), user devices (e.g., smartphones, laptops, etc.), customer premises equipment (e.g., gateway routers, cable modems, etc.), and/or the like. Many of the largest wireless networks are implemented by network service providers, who use such networks to provision users with network services. A subscriber (e.g., user, customer, etc.) may obtain network access from the service provider. To provide the network access service, the service provider may install and/or provision a customer premises equipment (CPE) (e.g., a gateway router, a cable modem, etc.) at the customer's premises (e.g., home, business, etc.) that implements a local area network (LAN). In some examples, client devices (e.g., computers, mobile devices, smart appliances, etc.) may connect to the LAN, thereby obtaining internet services provided by the service provider.

Client devices connected to a LAN typically communicate with other devices connected to the same LAN via layer 2 communication protocols and with devices connected to another LAN via layer 3 communication protocols. Layer 3 protocol communications are facilitated via a gateway router that is typically physically connected to the same LAN and is also connected to another network, such as a network of a service provider that provides broadband access to the entity operating the LAN. More particularly, the gateway router implements traditional gateway router services, such as dynamic host configuration protocol (DHCP) services for providing network-connected computing devices with internet protocol (IP) addresses as needed, network address translation (NAT) services to translate private IP addresses associated with a subnetwork to a public IP address, Domain Name System (DNS) services for translating a domain name to an IP address, and the like.

A service provider that provides internet services to users (e.g., customers, subscribers, etc.) may track or otherwise be aware of a number of performance metrics associated with its internet services. Performance metrics are often used to quantify various aspects of services that indirectly and/or directly affect customer (e.g., user) experience. One such performance metric is known as "latency," which is essential for assessing efficiency, responsiveness, and overall performance of network services provided by the service provider. More particularly, latency refers to a time delay in data transmission from one point to another in a network, such as, by way of non-limiting example, the time it takes for data to be transmitted from the service provider network to a client device operating on the LAN. High latency typically results in noticeable delays in data transmission and communication, which adversely affects the customer experience for the end-user.

A variety of network-related factors may affect latency and, hence, overall customer experience such as, inter alia, domain name system (DNS) services provided by the service provider. As discussed herein, DNS services are responsible for translating human-readable domain names (e.g., uniform resource locator (URL) addresses) into machine-readable IP addresses. As an illustrative example, a user may initiate a web-browsing transaction by typing or otherwise providing a URL address to a browser on a LAN-connected computing device. A gateway router implementing the LAN then provides a DNS lookup request (e.g., corresponding to the URL address) to the service provider, who is then responsible for resolving the DNS query by obtaining the machine-readable IP address that corresponds to the URL address provided by the user. As discussed in greater detail below, the service provider may have to communicate with a plurality of different computing devices (e.g., servers) in order to obtain the corresponding IP address. Hence, the time it takes to perform DNS services (e.g., receive and resolve DNS queries) greatly impacts latency in web-browsing transactions.

The embodiments disclosed herein address the aforementioned latency-related issues by intelligently determining DNS queries a user is likely to initiate and, then, resolving the predicted DNS queries during an initialization process of the gateway router. As described below, an "initialization process" and/or "initialization phase" of the gateway router refers to a process that occurs each time the gateway router is restarted, rebooted, and/or the like. The "initialization process" occurs prior to the gateway router connecting to a client device of the user. In some examples, an "initialization event" may trigger the "initialization process" for the gateway router. As one example, the "initialization event" may be a first instance the gateway router (and/or cable modem) establishes a connection to a network associated with the service provider, such as a service provider network implemented by a service provider computing system.

As discussed in greater detail below, the present disclosure provides a gateway router that is operable to obtain and store IP addresses for the user prior to connecting to the user's computing device, thereby reducing the latency associated with future web-browsing transactions initiated by the user. More particularly, after provisioning a gateway router for a user, a service provider may determine a DNS profile for the user based on customer profile data associated with the user. In some implementations, the DNS profile for the user may be determined based on an output from a machine-learned model of a service provider computing system associated with the service provider. The DNS profile may be user-specific and may include a plurality of fully qualified domain names (FQDNs). It should be understood that, although discussed herein with reference to FQDNs, example DNS profiles of the present disclosure may include any suitable address identifier, such as URL addresses, IP addresses, A records, and/or the like.

Once the user's gateway router comes online (e.g., begins its initialization process), the gateway router may request and receive the user's DNS profile from the service provider. The gateway router may then query a DNS service, such as a DNS service implemented by the service provider, to obtain IP addresses for each FQDN included in the user's DNS profile prior to the gateway router establishing a connection to any user device. Once resolved, the gateway router may then store the corresponding IP addresses in a local memory, such as a DNS cache. In this manner, the gateway router is operable to quickly and efficiently facilitate web-browsing transactions for the user than involve any of the FQDNs included in the user's DNS profile, thereby reducing latency in web-browsing transactions initiated by the user.

The present disclosure provides a number of technical effects and benefits, including improvements to computing technology. As one example, the present disclosure provides a gateway router operable to pre-resolve predicted DNS queries during its corresponding initialization process (e.g., prior to connecting to a client computing device), thereby reducing DNS-related latency experienced by the user and increasing user experience and satisfaction. For instance, by leveraging user-specific profile data, the service provider (e.g., service provider computing system) is able to intelligently determine and/or predict DNS queries users of provisioned gateway routers are likely to make. By providing user-specific DNS profiles (e.g., including address identifiers associated with the predicted DNS queries), example aspects provide dynamic, efficient, and scalable processes for intelligently pre-configuring DNS caches for each user.

Moreover, example aspects of the present disclosure provide resulting improvements to computing technology tasked with providing network services to users, such as service provider computing systems and/or service provider networks. As one example, improvements in the speed (e.g., latency reductions) of web-browsing transactions resulting from pre-configuring DNS caches may directly improve operation speeds for computing systems. Likewise, processing and storage requirements for computing systems may be directly reduced, ultimately resulting in more efficient resource use on both the user-side and the service provider-side. In this way, valuable computing resources within a computing system that would otherwise be needed for DNS-related tasks may be reserved for other tasks (e.g., managing network traffic, performing quality of service (QoS) actions, monitoring network security, etc.).

FIG. 1 is a block diagram of an environment 10 suitable for implementing one or more of the methods and/or processed disclosed herein, such as intelligently performing DNS services during an initialization process of a gateway router according to some embodiments. The environment 10 includes one or more customer premises, such as customer premises 12-1-12-N. The customer premises 12-1-12-N are each associated with a customer. For instance, the customer premises 12-1-12-N may be a customer's home, business, and/or other premises. Each customer premises 12-1-12-N may include an access device, such as a modem, such as a cable modem 14 (e.g., a D4.0 cable modem). It should be understood that the customer premises 12-1-12-N may include any suitable customer premises equipment (CPE) device without deviating from the scope of the present disclosure.

As shown, the cable modem 14 includes processor device(s) 16 and a memory 18. The processor device(s) 16 may include any computing or electronic device capable of executing software instructions to implement the functionality described herein. The memory 18 can be or otherwise include any device(s) capable of storing data, including, but not limited to, volatile memory (random access memory, etc.), non-volatile memory, storage device(s) (e.g., hard drive(s), solid state drive(s), etc.).

The cable modem 14 may be operable to access other networks, such as a wide-area network (WAN) 80 (e.g., a hybrid fiber-coaxial network and/or distributed access architecture (DAA) network), through a network interface (e.g., WAN port 20). For instance, in some implementations, the WAN port 20 may be a coaxial interface operable to communicate over a coaxial data line. The WAN port 20 may include RF front-end circuitry that does suitable demodulation on data received via the network 80, such as data received from a service provider network 22 (implemented by service provider 24) via network 80, and suitable modulation for data sent by the cable modem 14 to the service provider network 22 via the network 80.

In addition, the cable modem 14 may include or be communicatively coupled to diplexers, splitters, and combiners that enable the cable modem 14 to operate in different frequency plans as specified in the DOCSIS 4.0 PHY specification. In addition, the cable modem 14 may include the RF front-end circuit for the cable modem 14. This RF front-end circuit demodulates the downstream DOCSIS signals for processing by the cable modem 14 and modulates the upstream DOCSIS signals from the cable modem 14 for transmission via the WAN port 20. Although illustrated separately from the service provider network 22, in some implementations the network 80 may be part of the service provider network 22.

The service provider network 22 includes a service provider computing system 26 that is implemented by the service provider 24. The service provider computing system 26 includes an aggregation device 28. The aggregation device 28 includes a processor device 30 and a memory 32, and provides services such as, by way of non-limiting example, internet access and/or voice services, to a plurality of premises, such as premise 12-1. The aggregation device 28 may be any suitable aggregation device, such as a cable management termination system (CMTS), an optical line terminal (OLT), and/or the like.

In some implementations, such as that depicted in FIG. 1, the service provider computing system 26 may be a computing system that includes multiple computing devices having at least one processor device (e.g., processor device 36) and at least one data store (e.g., memory 38), such as one or more computing devices 34-1-34-N and/or one or more server computing devices (e.g., DNS server(s) 52, dynamic host configuration protocol (DHCP) server(s) 54, network time protocol (NTP) server(s) 56, configuration server(s), firmware server(s), etc.). In some implementations, the memory 38 may be included in one of the computing devices, such as computing device 34-1. Additionally and/or alternatively, in some implementations, the memory 38 may be a standalone data store. In some implementations, the service provider network 22 and, hence, the service provider computing system 26 may be one or more computing devices (e.g., computing device 30-1) within a computing environment that includes multiple distributed devices and/or systems. It should be understood that the service provider network 22 and/or the service provider computing system 26 is depicted with multiple computing devices and multiple server computing devices for purposes of illustration and discussion.

The cable modem 14 may be communicatively coupled to one or more CPEs associated with a local area network (LAN) 40, such as a wired CPE (e.g., gateway router 42) and a wireless CPE (e.g., access point (AP) (not shown)). In some examples, such as that depicted in FIG. 1, the CPE is a gateway router 42 that connects to one or more client devices 44-1-44-N (collectively, "client devices 44") and communicates with the cable modem 14 to provide layer 3 connectivity to other client devices of other networks. Put differently, the gateway router 42 is the device to which the client devices 44 send messages (e.g., data) that are destined for a computing device that is not operating on the LAN 40, such as any of the computing devices of the service provider network 22 and/or other computing devices operating on the network 80. Additionally and/or alternatively, in some examples, the gateway router 42 may be integrated into the cable modem 14 to provide layer 3 connectivity between the client devices 44 and other client devices of other networks.

It should be understood that "client device" and "client computing device" are synonymous and may be used interchangeably herein.

The gateway router 42 includes processor device(s) 46 and a memory 48. The processor device(s) 46 may include any computing or electronic device capable of executing software instructions to implement the functionality described herein. The memory 48 can be or otherwise include any device(s) capable of storing data, including, but not limited to, volatile memory (random access memory, etc.), non-volatile memory, storage device(s) (e.g., hard drive(s), solid state drive(s), etc.).

To provide network services to the user, the service provider 24 provisions the cable modem 14 and the gateway router 42 to operate on the service provider network 22. Subsequently, upon power-up and/or reboot, the gateway router 42 initiates an initialization phase (e.g., initialization process) that involves loading and initiating an operating system (OS) and otherwise setting up the gateway router 42 for communications with other devices, such as wireless CPEs (e.g., access points (APs)), the cable modem 14, the aggregation device 28, and/or the like. During this initialization process, the gateway router 42 obtains an IP address 50 from the service provider computing system 26 (e.g., from the DHCP server 54 in the service provider network 22) to establish and provide layer 3 connectivity to the client devices 44 operating on the LAN 40 implemented by the gateway router 42.

It should be understood that, as used herein, the "initialization process" and/or "initialization phase" refers to a process that occurs each time the gateway router 42 is initiated (e.g., restarted, rebooted, etc.) and prior to connecting to a client device 44. As described herein, an "initialization event" may trigger the initialization process of the gateway router 42. It should be understood that, as used herein, an "initialization event" in some implementations may refer to a first instance the gateway router 42 establishes a connection to the service provider network 22 associated with the service provider computing system 26; the "initialization event" occurs subsequent to the service provider 24 provisioning the gateway router 42 to operate on the service provider network 22 and prior to the gateway router 42 connecting to a client device 44. Those having ordinary skill in the art, using the disclosures provided herein, will appreciate that the "initialization process" and/or "initialization phase" of the gateway router 42 occurs prior to the gateway router 42 establishing a connection to any of the client computing devices 44-1-44-N.

As noted above, the service provider computing system 26 may include one or more server computing devices and/or one or more server computing systems, such as, by way of non-limiting example, the DNS server 52, the DHCP server 54, the NTP server 56, and/or the like.

For instance, the DNS server 52 may be a server computing device that is communicatively coupled to the gateway router 42 (e.g., via the cable modem 14) over the network 80. The DNS server 52 may include at least one processor device (not shown) and at least one memory (not shown), which may be similar to any of the processor device(s) and/or memories described herein. As will be discussed in greater detail below, the DNS server 52 may be operable to facilitate web-browsing transactions for the device(s) operating on the LAN 40 (e.g., client devices 44) by resolving DNS queries from the device(s) operating on the LAN 40.

By way of non-limiting example, a user may initiate a web-browsing transaction by typing or otherwise providing a human-readable domain name, such as a URL address, to a browser on the client device 44-1. The client device 44-1 provides a resource request associated with the web-browsing transaction (e.g., corresponding to the URL address) to the gateway router 42. The gateway router 42 provides a DNS lookup to a DNS service, such as the DNS server 52, to obtain the IP address associated with the resource request (e.g., corresponding to the URL address). In some examples, the corresponding IP address may be stored in the memory 38 of the service provider computing system 26. In other examples, the DNS server 52 may obtain an Address record (hereinafter "A record") from an authoritative DNS server (not shown), which includes the corresponding IP address associated with the resource request. The service provider computing system 26 provides the corresponding IP address to the gateway router 42, and the gateway router 42 provides the IP address corresponding to the URL address to the client device 44-1 to resolve the web-browsing transaction.

As used herein, a "DNS query" and/or a "DNS lookup" refers to a request from a network device (e.g., operating on the LAN 40) to the DNS server 52 for an IP address associated with a human-readable domain name (e.g., in URL format). It should be understood that, although depicted in FIG. 1 as having one DNS server 52, the service provider computing system 26 may include more than one DNS server 52 without deviating from the scope of the present disclosure.

The DHCP server 54 may also be a server computing device that is communicatively coupled to the gateway router 42 (e.g., via the cable modem 14) over the network 80. The DHCP server 54 may include at least one processor device (not shown) and at least one memory (not shown), which may be similar to any of the processor device(s) and/or memories described herein. The DHCP server 54 may be configured to assign IP addresses and other network configuration parameters to devices (e.g., client devices 44) operating on the LAN 40, the service provider network 22, and/or the like. It should be understood that, although depicted in FIG. 1 as having one DHCP server 54, the service provider computing system 26 may include more than one DHCP server 54 without deviating from the scope of the present disclosure.

The NTP server 56 may also be a server computing device that is communicatively coupled to the gateway router 42 (e.g., via the cable modem 14) over the network 80. The NTP server 56 may include at least one processor device (not shown) and at least one memory (not shown), which may be similar to any of the processor device(s) and/or memories described herein. The NTP server 56 may be configured to synchronize a clock of each connected device (e.g., operating on the LAN 40, the service provider network 22, etc.) to ensure each connected device maintains accurate and consistent time. It should be understood that, although depicted in FIG. 1 as having one NTP server 56, the service provider computing system 26 may include more than one NTP server 56 without deviating from the scope of the present disclosure.

It should be understood that the service provider computing system 26 may include any suitable server computing device, such as, by way of non-limiting example, Trivial File Transfer Protocol (TFTP) servers, Automatic Configuration Servers (ACS), SNMP servers, Speed Test servers, and/or the like.

As noted above, the gateway router 42 is operable to pre-resolve predicted DNS queries during its corresponding initialization process (e.g., prior to implementing the LAN 40) to reduce DNS-related web-browsing latency and enhance customer experience. For instance, the service provider 24 (via service provider computing system 26) may provision the gateway router 42 associated with the user and the premises 12-1. After provisioning the gateway router 42, but prior to the gateway router 42 connecting to the client devices 44, the service provider computing system 26 is operable to determine a domain name system (DNS) profile 58-1 for the user associated with the gateway router 42. The DNS profile 58-1 for the user may be determined based on customer profile data 60 associated with the user. The customer profile data 60 may be stored in the memory 38 and may include data provided by the user to the service provider 24 during a registration process (e.g., occurring prior the provisioning of the gateway router 42). By way of non-limiting example, the customer profile data 60 may include demographic data 62 associated with the user (e.g., age, gender, race, nationality, ethnicity, occupation, language, etc.), geographic data 64 associated with the premises 12 serviced by the gateway router 42 (e.g., city, state, ZIP code, neighborhood, size, type, etc.), and/or the like. It should be understood that the service provider computing system 26 is operable to determine user-specific DNS profiles 58-1-58-N for each premises 12-1-12-N serviced by the service provider 24.

The service provider computing system 26 includes a machine-learned model 66. In some implementations, the machine-learned model 66 may be stored in a model handler (not shown) in the memory 38. The model handler may obtain, instantiate, train, optimize, and utilize various machine-learned models. To do so, the model handler may include a model repository (not shown) and a model trainer (not shown). The model repository may store and catalogue information regarding the machine-learned model 66 utilized to generate DNS profiles 58-1-58-N for the plurality of users of the plurality of gateway routers associated with the service provider computing system 26. The model trainer may be utilized to train the machine-learned model 66 stored in the model repository.

The machine-learned model 66 may be or may otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. In some implementations, the machine-learned model 66 may leverage an attention mechanism such as self-attention. For instance, in some implementations, the machine-learned model 66 may include multi-headed self-attention models (e.g., transformer models). Additionally and/or alternatively, in some other contexts, a "model" may refer to a portion of a model, or multiple models or portions of models. For example, a Generative Adversarial Network (GAN) may include an encoder model and decoder model during training, while the encoder model may be utilized exclusively during inference. The term "model" may refer to either, or both, of these models depending on the context in which the term is used. It should be understood that any suitable machine-learned model may be used without deviating from the scope of the present disclosure.

The machine-learned model 66 may be operable to generate granular, user-specific DNS profiles 58-1-58-N for a plurality of users of a plurality of gateway routers (e.g., a plurality of premises 12-1-12-N) associated with the service provider computing system 26. As described in greater detail below, the machine-learned model 66 may ingest the customer profile data 60 and may be trained to output data associated with predicted FQDNs 68-1-68-N.

The model repository (not shown) may include model information that tracks various characteristics of the machine-learned model 66. In particular, the model information may include a timestamp for the last time a model was updated or trained, a version number, an identifier, local processing capabilities, estimated compute usage (e.g., X number of FLOPS to utilize for inference), processing latency (e.g., 15 seconds to generate a predicted FQDN list), etc.

The machine-learned model handler (not shown) may utilize the model trainer (not shown) to train the machine-learned model 66. The model trainer may include an iterative optimizer that trains, or otherwise optimizes, the machine-learned model 66 when feedback data (e.g., feedback data 76) is received from, for instance, the gateway router 42. Additionally and/or alternatively, in some implementations, the iterative optimizer may directly optimize model outputs from the machine-learned model 66. The model trainer may include a federated learning module that implements federated learning techniques to more efficiently optimize the machine-learned model 66. In this manner, updates to the machine-learned model 66 may be calculated and provided to a distributed network of computing devices in a federated manner. The model trainer may include loss functions that are utilized to train the machine-learned model 66 in a supervised manner. More specifically, the loss functions may evaluate differences between the output 70 of the machine-learned model 66 and corresponding ground-truth outputs. In some implementations, the loss functions may include a loss function configured to train the machine-learned model 66 in an end-to-end fashion. The loss functions may include various evaluation criteria selected to efficiently optimize the machine-learned model.

The service provider computing system 26 may include a model output repository (not shown). The model output repository may store outputs generated using the machine-learned model 66. Specifically, the model output repository may include a machine learning model output 70 that includes data output by the machine-learning model 66. The model output repository may include model output information that stores information descriptive of various characteristics of the model output 70.

By way of non-limiting example, to generate the DNS profile 58-1 for the user associated with the gateway router 42, the customer profile data 60 associated with the user of the gateway router 42 may be provided as an input to the machine-learned model 66 of the service provider computing system 26. The service provider computing system 26 may determine a predicted fully qualified domain name (FQDN) 68-1 and/or a plurality of predicted FQDNs 68-1-68-N based on an output 70 of the machine-learned model 66. The predicted FQDNs 68-1-68-N are FQDNs associated with predicted web-browsing transactions the user of the gateway router 42 will likely initiate which, in some implementations, are determined based on actual web-browsing transactions initiated by other users having similar characteristics as the user of the gateway router 42. The DNS profile 58-1 for the user of the gateway router 42 may include any number of predicted FQDNs 68-1-68-N without deviating from the scope of the present disclosure. In this manner, the service provider computing system 26 may determine the DNS profile 58-1 for the user of the gateway router 42 based on the output 70 of the machine-learned model 66 (e.g., based on the customer profile data 60 associated with the user).

As described above, the DNS profile 58-1 associated with the user of the gateway router 42 is generated after the service provider computing system 26 provisions the gateway router 42 but prior to the initialization process of the gateway router 42. By way of non-limiting example, the initialization process may be initiated during a first instance the gateway router 42 attempts to (or does) establish connection to the service provider network 22 associated with the service provider computing system 26. Additionally and/or alternatively, in some implementations, the initialization process may be initiated following a reboot and/or restart process of the gateway router 42 but prior to the gateway router 42 reestablishing a connection to any of the client computing devices 44-1-44-N. Those having ordinary skill in the art, using the disclosures provided herein, will appreciate that the DNS profile 58-1 is generated prior to the gateway router 42 establishing a connection to any of the client computing devices 44-1-44-N.

More particularly, during the initialization process of the gateway router 42, the gateway router 42 may obtain the IP address 50 for the gateway router 42 from the service provider computing system 26, such as from the DHCP server 54. Once the IP address 50 is obtained, the gateway router 42 may then connect to the service provider network 22. More particularly, the gateway router 42 may provide a DNS profile request to the service provider computing system 26, and, in response, the service provider computing system 26 may provide the DNS profile 58-1 to the gateway router 42. In some implementations, the gateway router 42 may store the DNS profile 58-1 in a DNS cache, such as the memory 48. It should be understood that the DNS profile 58-1 is provided to the gateway router 42 prior to the gateway router 42 establishing connection to any of the client devices 44-1-44-N.

Before connecting to any of the client devices 44-1-44-N (e.g., during the initialization process), the gateway router 42 queries a DNS service, such as the DNS server 54, to obtain IP addresses 72-1-72-N corresponding to the predicted FQDNs 68-1-68-N included in the DNS profile 58-1. More particularly, in response to receiving the DNS profile 58-1 from the service provider computing system 26, the gateway router 42 may provide a DNS lookup request for each of the predicted FQDNs 68-1-68-N to the DNS server 52. The DNS server 52 may resolve each DNS lookup request by obtaining each corresponding IP address 72-1-72-N and may provide each corresponding IP address 72-1-72-N to the gateway router 42. The gateway router 42 may store the IP addresses 72-1-72-N received from the service provider computing system 26 (e.g., the DNS server 52) in a DNS cache, such as the memory 48. In this manner, the gateway router 42 is operable to reduce latency in web-browsing transactions initiated by the user of the gateway router 42 following the initialization process.

By way of non-limiting example, subsequent to storing the IP addresses 72-1-72-N corresponding to the predicted FQDNs 68-1-68-N in the memory 48, the gateway router 42 may implement the LAN 40 and facilitate a connection between a client computing device (e.g., client devices 44-1-44-N) on the LAN 40 and a wide area network (WAN), such as the network 80. Subsequently, the gateway router 42 may receive a resource request from the client computing device (e.g., client devices 44-1-44-N) that is associated with a web-browsing transaction initiated by the user. In some implementations, the resource request includes a uniform resource locator (URL) address that the user typed or otherwise input to a browsing client (e.g., web browser) on the client computing device (e.g., client devices 44-1-44-N).

To resolve the web-browsing transaction initiated by the user, the gateway router 42 determines whether the URL address included in the resource request corresponds to a predicted FQDN 68-1-68-N included in the DNS profile 58-1 that is stored in the memory 48.

In some implementations, the gateway router 42 determines the URL address does correspond to an IP address 72-1-72-N corresponding to the predicted FQDN 68-1-68-N that is stored in the DNS cache of the gateway router 42 (e.g., memory 48). In such implementations, the gateway router 42 provides the IP address 72-1-72-N (e.g., corresponding to the URL address) to the client computing device (e.g., client devices 44-1-44-N) to resolve the web-browsing transaction without querying the DNS service (e.g., DNS server 52). Hence, the gateway router 42 reduces a resolution time in the web-browsing transaction (e.g., latency) that would otherwise be spent querying a DNS service (e.g., DNS server 52).

Additionally and/or alternatively, in other implementations, the gateway router 42 determines the URL address does not correspond to any IP address 72-1-72-N (e.g., corresponding to the predicted FQDN 68-1-68-N) that is stored in the DNS cache of the gateway router 42 (e.g., memory 48). In such implementations, the gateway router 42 queries the DNS service (e.g., DNS server 52) to obtain an IP address 74-1-74-N corresponding to the URL address of the resource request. In response to receiving the DNS lookup request from the gateway router 42, the DNS service (e.g., DNS server 52) resolves the DNS query and provides the IP address 74-1-74-N (e.g., corresponding to the URL address) to the gateway router 42, which then provides the IP address 74-1-74-N to the client computing device (e.g., client devices 44-1-44-N) to resolve the web-browsing transaction.

In some implementations, the gateway router 42 also stores a FQDN 78-1-78-N associated with the URL address (e.g., corresponding to IP address 74-1-74-N) in the DNS cache (e.g., memory 48). The gateway router 42 may provide feedback data 76 to the service provider computing system 26, and the service provider computing system 26 may train the machine-learned model 66 with the feedback data 76.

By way of non-limiting example, the service provider computing system 26 may determine the DNS profile 58-1 for a first user, which is the user of the gateway router 42. Subsequent to determining the DNS profile 58-1 for the first user, the service provider computing system 26 may receive feedback data (e.g., similar to feedback data 76) from a second gateway router (not shown) that is associated with a second premises 12-2 (not shown). Similar to the feedback data 76 described above, the feedback data from the second gateway router may include a plurality of FQDNs (e.g., FQDNs 78-1-78-N) corresponding to a plurality of web-browsing transactions initiated by a second user, which is the user of the second gateway router. In some implementations, customer profile data (e.g., similar to customer profile data 60) associated with the second user matches or is otherwise similar to the customer profile data 60 associated with the first user. In such implementations, prior to providing the first gateway router 42 with the DNS profile 58-1 associated with the first user, the service provider computing system 26 (e.g., machine-learned model 66) may determine an updated DNS profile 58-1 for the first user based on the customer profile data 60 associated with the first user and the feedback data received from the second gateway router. In this manner, the service provider computing system 26 is operable to continuously update the DNS profile 58-1 so that, once the initialization process is initiated by the gateway router 42, the DNS profile 58-1 provided to the gateway router 42 (and the predicted FQDNs 68-1-68-N included therein) is up-to-date and accurate.

Figure 2:
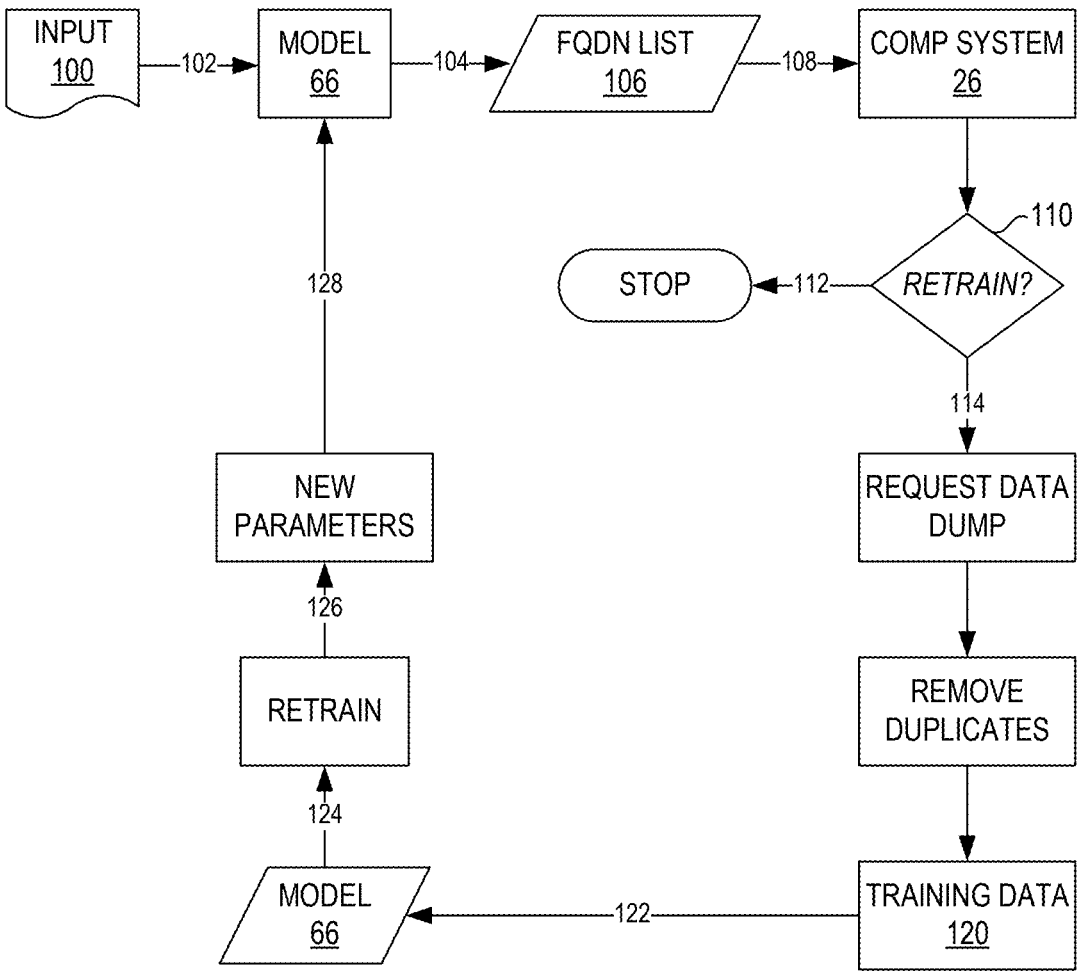
FIG. 2 is a data flow diagram for training the machine-learned model of FIG. 1 according to one implementation.

FIG. 2 is a data flow diagram for training the machine-learned model 66 of FIG. 1 according to one implementation of the present disclosure. FIG. 2 will be discussed in conjunction with FIG. 1. More particularly, as described above, the service provider computing system 26 includes a machine-learned model 66 operable to generate granular, user-specific DNS profiles (e.g., DNS profiles 58-1-58-N)

for a plurality of users of gateway routers associated with the service provider computing system 26.

Subsequent to provisioning the gateway router 42 to operate on the service provider network 22, but prior to the gateway router 42 performing the corresponding initialization process, the service provider computing system 26 provides user-specific data, such as customer profile data 60, as an input 100 to the machine-learned model 66 (FIG. 2, step 102), which outputs a predicted FQDN list 106 for the user based on the input 100 (FIG. 2, step 104). The predicted FQDN list 106 output by the machine-learned model 66 is provided to the service provider computing system 26 (FIG. 2, step 108), which then determines a DNS profile (e.g., DNS profile 58-1) for the user. As described above, the DNS profile includes one or a plurality of predicted FQDNs (e.g., predicted FQDNs 68-1-68-N) for the user of the gateway router 42.

The service provider computing system 26 (e.g., machine-learned model 66) then determines whether a retrain interval associated with the machine-learned model 66 expired (FIG. 2, step 110). If the retrain interval has not expired, the service provider computing system 26 (e.g., machine-learned model 66) determines the predicted FQDN list 106 output by the machine-learned model 66 is accurate and that no retraining is needed (FIG. 2, step 112). The corresponding DNS profile (e.g., DNS profile 58-1) is then stored in a memory (e.g., memory 38) of the service provider computing system 26 for transmission to the gateway router 42 during the initialization process of the gateway router 42.

If the retrain interval has expired, the service provider computing system 26 (e.g., machine-learned model 66) determines the predicted FQDN list 106 output by the machine-learned model 66 is not accurate and that retraining is needed (FIG. 2, step 114). The service provider computing system 26 (e.g., machine-learned model 66) requests a data dump (e.g., requests the initial DNS profile 58-1 be removed from memory 38) (FIG. 2, step 116). The service provider computing system (e.g., machine-learned model 66) then removes any duplicate entries present in the predicted FQDN list 106 initially output by the machine-learned model 66 (FIG. 2, step 118). The service provider computing system 26 obtains training data 120 (e.g., similar to feedback data 76 described above) and provides the training data 120 to the machine-learned model 66 (FIG. 2, step 122). The machine-learned model 66 is trained with the training data 120 (FIG. 2, step 124), and new parameters (if any) are applied to the machine-learned model 66 (FIG. 2, step 126).

Subsequently, the service provider computing system 26 provides the user-specific data (e.g., customer profile data 60) as the input 100 to the machine-learned model 66, and an updated predicted FQDN list 106 may then be generated (FIG. 2, step 128).

FIGS. 3A-3D are sequence diagrams illustrating messages communicated between and actions taken by certain components illustrated in FIG. 1 to resolve web-browsing transactions according to one implementation of the present disclosure. FIGS. 3A-3D will be discussed in conjunction with FIG. 1.

Figure 3A:
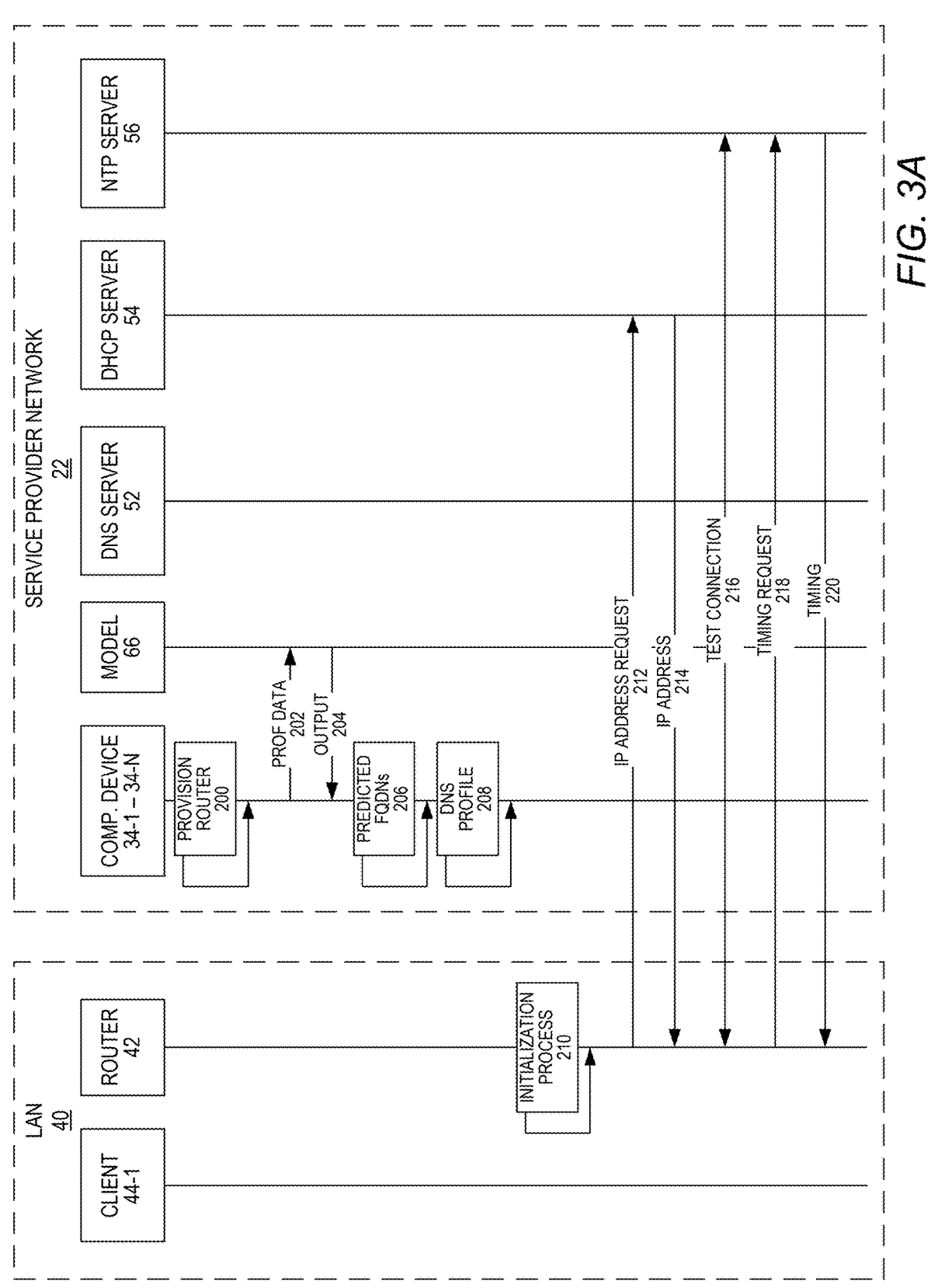
FIGS. 3A-3D are sequence diagrams illustrating messages communicated between and actions taken by certain components illustrated in FIG. 1 to resolve web-browsing transactions according to one implementation.

Referring to FIG. 3A, the service provider computing system 26 (e.g., computing devices 34-1-34-N) provision the gateway router 42 associated with the user with network services (FIG. 3A, step 200). Subsequently, the service provider computing system 26 (e.g., computing devices 34-1-34-N) provide customer profile data 60 to the machine-learned model 66 (FIG. 3A, step 202). As described above, the customer profile data 60 includes demographic data 62 associated with the user, geographic data 64 associated with the premises 12-1 serviced by the gateway router 42, and/or the like. The machine-learned model 66 provides an output 70 (FIG. 3A, step 204), and the service provider computing system 26 (e.g., computing devices 34-1-34-N) determine a plurality of predicted FQDNs 68-1-68-N for the user based on the output 70 of the machine-learned model 66 (FIG. 3A, step 206). The service provider computing system 26 (e.g., computing devices 34-1-34-N) determine the DNS profile 58-1 for the user (FIG. 3A, step 208). As described above, the DNS profile 58-1 for the user is determined based on the customer profile data 60 associated with the user.

The gateway router 42 initiates an initialization process (FIG. 3A, step 210). In some implementations, the initialization process may be initiated concurrently with and/or subsequently to a first instance the gateway router 42 establishes a connection to the service provider network 22. Additionally and/or alternatively, in some implementations, the initialization process may be initiated following a reboot and/or restart process of the gateway router 42. Those having ordinary skill in the art, using the disclosures provided herein, will understand that the initialization process occurs prior to the gateway router 42 establishing connection to any of the client computing devices 44-1-44-N.

During the initialization process, the gateway router 42 provides an IP address request to the DHCP server 54 of the service provider computing system 26 (FIG. 3A, block 212). In response to receiving the IP address request from the gateway router 42, the DHCP server 54 of the service provider computing system 26 provides the IP address 50 to the gateway router 42 (FIG. 3A, step 214). The gateway router 42 then establishes a connection to the service provider network 22 and tests the connection by pinging the DNS server 52 (FIG. 3A, step 216). The gateway router 42 also provides a timing request to the NTP server 56 (FIG. 3A, step 218). In response to receiving the timing request from the gateway router 42, the NTP server 54 provides an NTP response packet to the gateway router 42, thereby synchronizing a clock of the gateway router 42 and other devices operating on the LAN 40 (FIG. 3A, step 220).

Figure 3B:
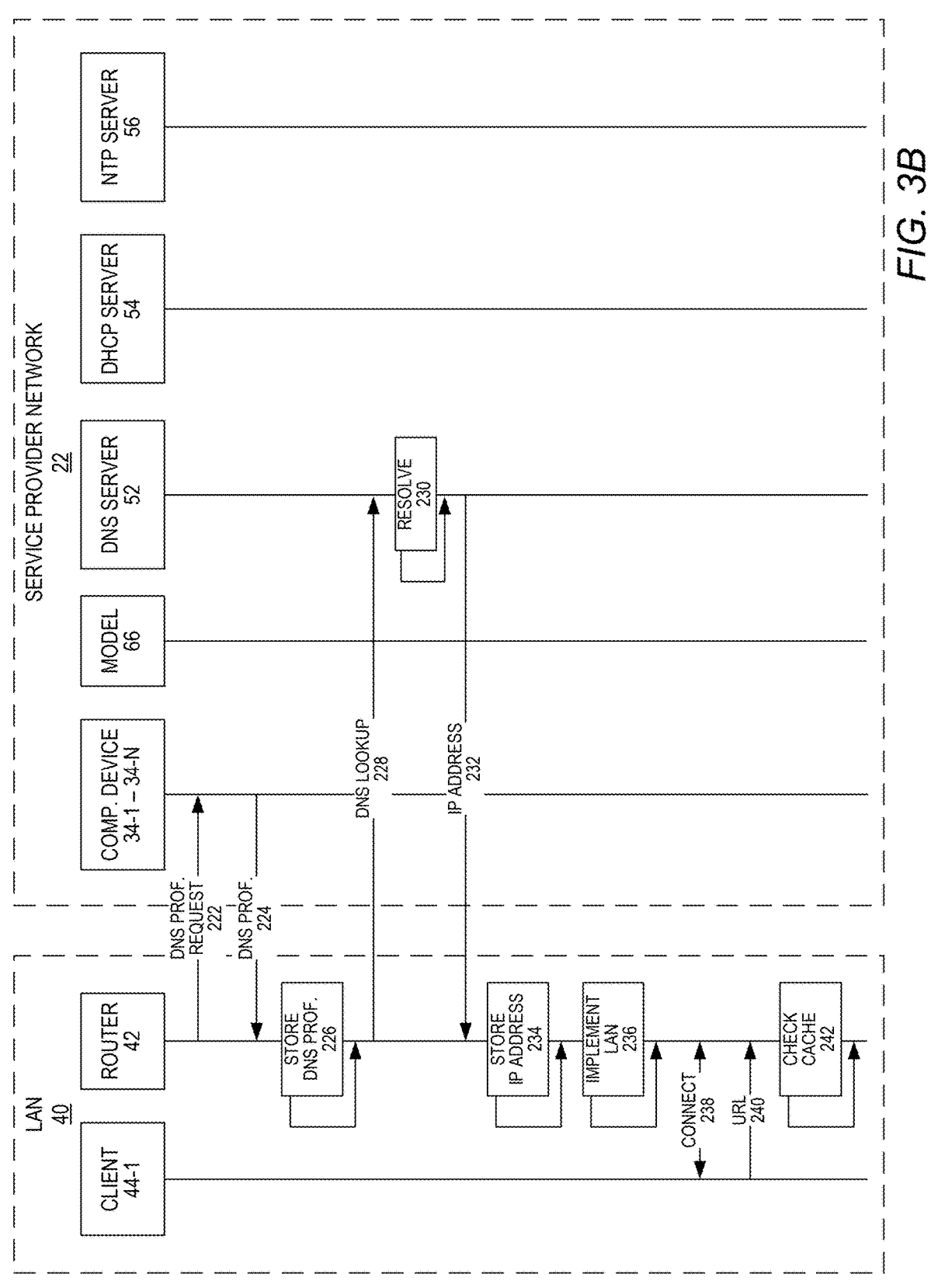

Referring now to FIG. 3B, the gateway router 42 provides a DNS profile request to the service provider computing system 26 (e.g., computing devices 34-1-34-N) (FIG. 3B, step 222). In response, the service provider computing system 26 (e.g., computing devices 34-1-34-N) provides the DNS profile 58-1 associated with the user of the gateway router 42 to the gateway router 42 (FIG. 3B, step 224). The gateway router 42 receives the DNS profile 58-1 and, in response, stores the DNS profile 58-1 in a DNS cache of the gateway router 42 (e.g., memory 48) (FIG. 3B, step 226). As noted above, the DNS profile 58-1 includes the plurality of predicted FQDNs 68-1-68-N that were determined based on the customer profile data 60 associated with the user.

The gateway router 42 then queries a DNS service, such as the DNS server 52, to obtain IP addresses 72-1-72-N (e.g., corresponding to the predicted FQDNs 68-1-68-N included in the DNS profile 58-1) by providing a DNS lookup request to the DNS server 52 (FIG. 3B, step 228). The DNS server 52 then resolves the DNS lookup request (FIG. 3B, step 230) and provides the IP addresses 72-1-72-N to the gateway router 42 (FIG. 3B, step 232). It should be understood that, although depicted as only providing one DNS lookup request to the DNS server 52, the gateway router 42 may provide at least one DNS lookup request to the DNS server 52 for each predicted FQDN 68-1-68-N included in the DNS profile 58-1.

The gateway router 42 receives each IP address 72-1-72-N corresponding to each predicted FQDN 68-1-68-N from the DNS server 52 and, subsequently, stores each IP address 72-1-72-N in the DNS cache (e.g., memory 48) (FIG. 3B, step 234). The gateway router 42 continues with the initialization process by implementing the LAN 40 (FIG. 3B, step 236) and connecting to client computing device 44-1 (FIG. 3B, step 238) to facilitate a connection between the client computing device 44-1 and an external network, such as the service provider network 22 and/or the network 80 (e.g., wide area network (WAN) 80). It should be understood that only one client computing device 44-1 is depicted for purposes of illustration and discussion. However, those having ordinary skill in the art, using the disclosures provided herein, will appreciate that the gateway router 42 may facilitate connection between any number of client computing devices 44-N without deviating from the scope of the present disclosure.

Subsequent to implementing the LAN 40 and establishing connection to the client computing device 44-1, the user of the client computing device 44-1 may initiate a web-browsing transaction by typing or otherwise providing a URL address to a browsing client (e.g., web browser). More particularly, the gateway router 42 receives a resource request associated with the web-browsing transaction, which includes the URL address, from the client computing device 44-1 (FIG. 3B, step 240). In response, the gateway router 42 determines whether an IP address corresponding to the URL address (e.g., of the resource request) is stored in the DNS cache (e.g., memory 48) of the gateway router 42 (FIG. 3B, step 242).

Figure 3C:
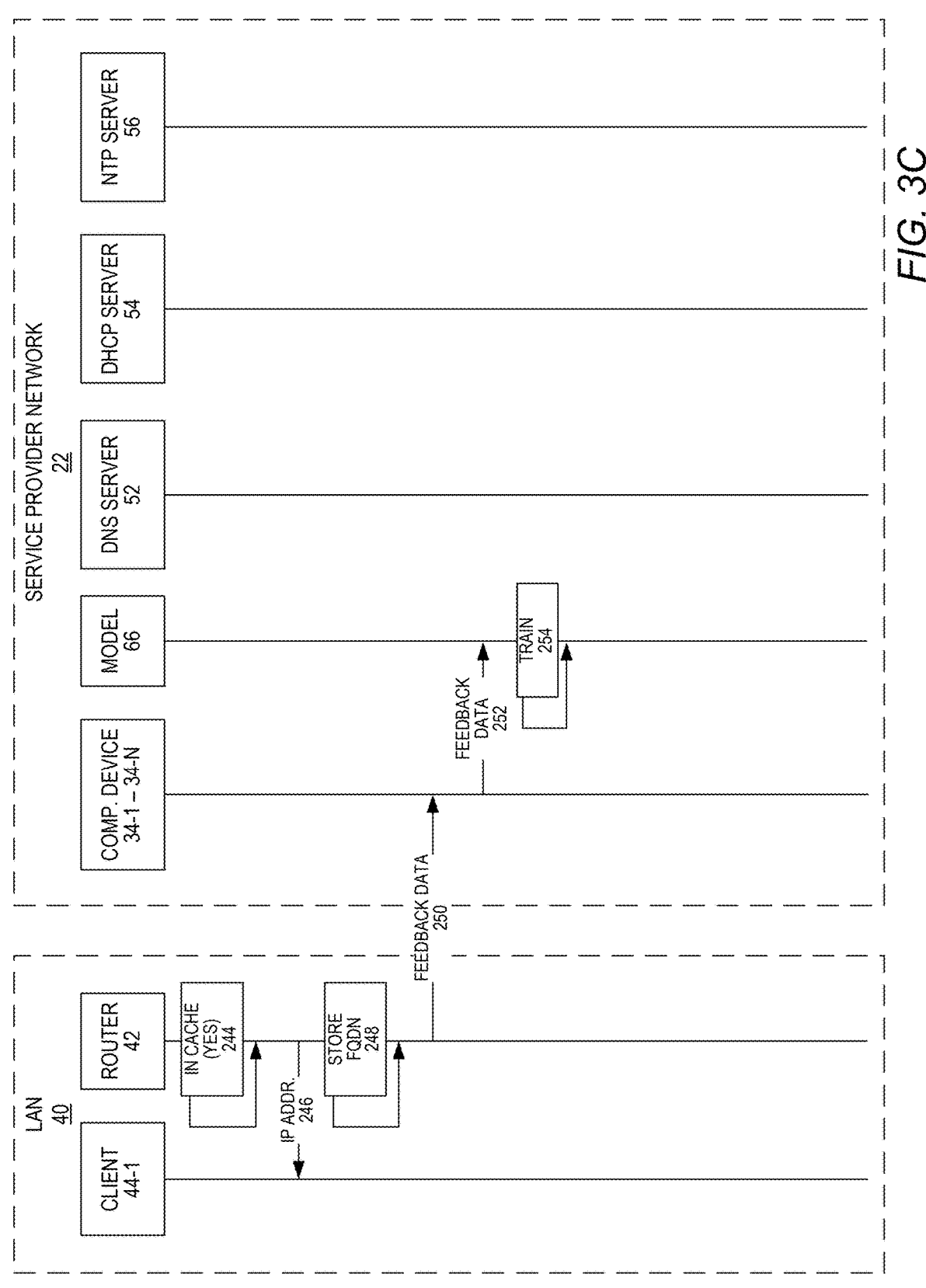

Referring now to FIG. 3C, in some implementations, the gateway router 42 determines (at FIG. 3B, step 242) that the URL address (e.g., of the resource request) corresponds to one of IP addresses 72-1-72-N stored in the DNS cache (e.g., memory 38) (FIG. 3C, step 244). In such implementations, the gateway router 42 provides the IP address 72-1-72-N that corresponds to the URL address to the client computing device 44-1 (FIG. 3C, step 246), thereby resolving the web-browsing transaction initiated by the user without querying the DNS server 52. The gateway router 42 stores the corresponding FQDN 68-1-68-N associated with the web-browsing transaction in the memory 48 as feedback data 76 (FIG. 3C, step 248). In some implementations, the gateway router 42 provides the feedback data 76 to the service provider computing system 26 (e.g., computing devices 34-1-34-N) (FIG. 3C, step 250). In such implementations, the service provider computing system 26 (e.g., computing devices 34-1-34-N) provides the feedback data 76 to the machine-learned model 66 (FIG. 3C, step 252), which is then used as training data to train the machine-learned model 66 (FIG. 3C, step 254).

Figure 3D:
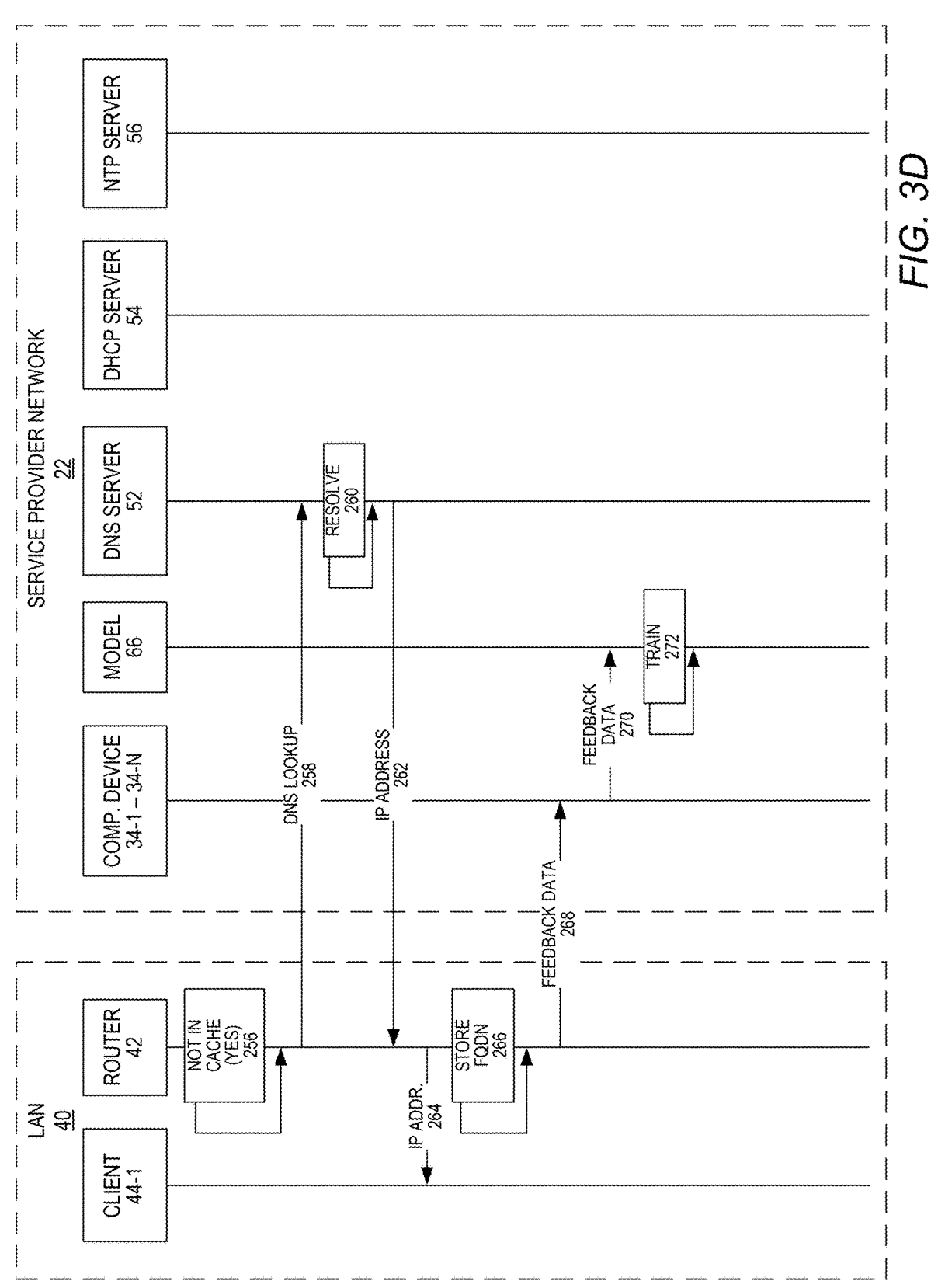

Referring now to FIG. 3D, in some implementations, the gateway router 42 determines (at FIG. 3B, step 242) that the URL address (e.g., of the resource request) does not correspond to one of IP addresses 72-1-72-N stored in the DNS cache (e.g., memory 38) (FIG. 3D, step 256). In such implementations, the gateway router 42 queries the DNS server 52 to obtain an IP address 74-1 that corresponds to the URL address (e.g., of the resource request) by providing a DNS lookup request to the DNS server 52 (FIG. 3D, step 258). The DNS server 52 then resolves the DNS lookup request (FIG. 3D, step 260) and provides the IP address 74-1 to the gateway router 42 (FIG. 3D, step 262). The gateway router 42 provides the IP address 74-1 corresponding to the URL address to the client computing device 44-1 (FIG. 3D, step 264) to resolve the web-browsing transaction. The gateway router 42 stores the corresponding FQDN 78-1 associated with the web-browsing transaction (e.g., associated with the URL address) in the memory 48 as feedback data 76 (FIG. 3D, step 266). In some implementations, the gateway router 42 provides the feedback data 76 to the service provider computing system 26 (e.g., computing devices 34-1-34-N) (FIG. 3D, step 268). In such implementations, the service provider computing system 26 (e.g., computing devices 34-1-34-N) provides the feedback data 76 to the machine-learned model 66 (FIG. 3D, step 270), which is then used as training data to train the machine-learned model 66 (FIG. 3D, step 272).

FIG. 4 is a flowchart of an example method for pre-configuring a memory of a gateway router according to one implementation of the present disclosure. FIG. 4 will be discussed in conjunction with FIG. 1. During an initialization process of the gateway router 42, the gateway router 42 receives, from the service provider computing system 26, a domain name system (DNS) profile, such as DNS profile 58-1, associated with a user of the gateway router 42 (FIG. 4, block 1000). As described herein, the DNS profile 58-1 includes a predicted fully qualified domain name (FQDN) 68-1 that is determined based on customer profile data 60 associated with the user. The gateway router 42 queries a DNS service, such as DNS server 52, to obtain an internet protocol (IP) address 72-1 corresponding to the predicted FQDN 68-1 (FIG. 4, block 1010). The gateway router 42 stores the IP address 72-1 corresponding to the predicted FQDN 68-1 in a DNS cache of the gateway router, such as memory 48 (FIG. 4, block 1020).

Figure 5:
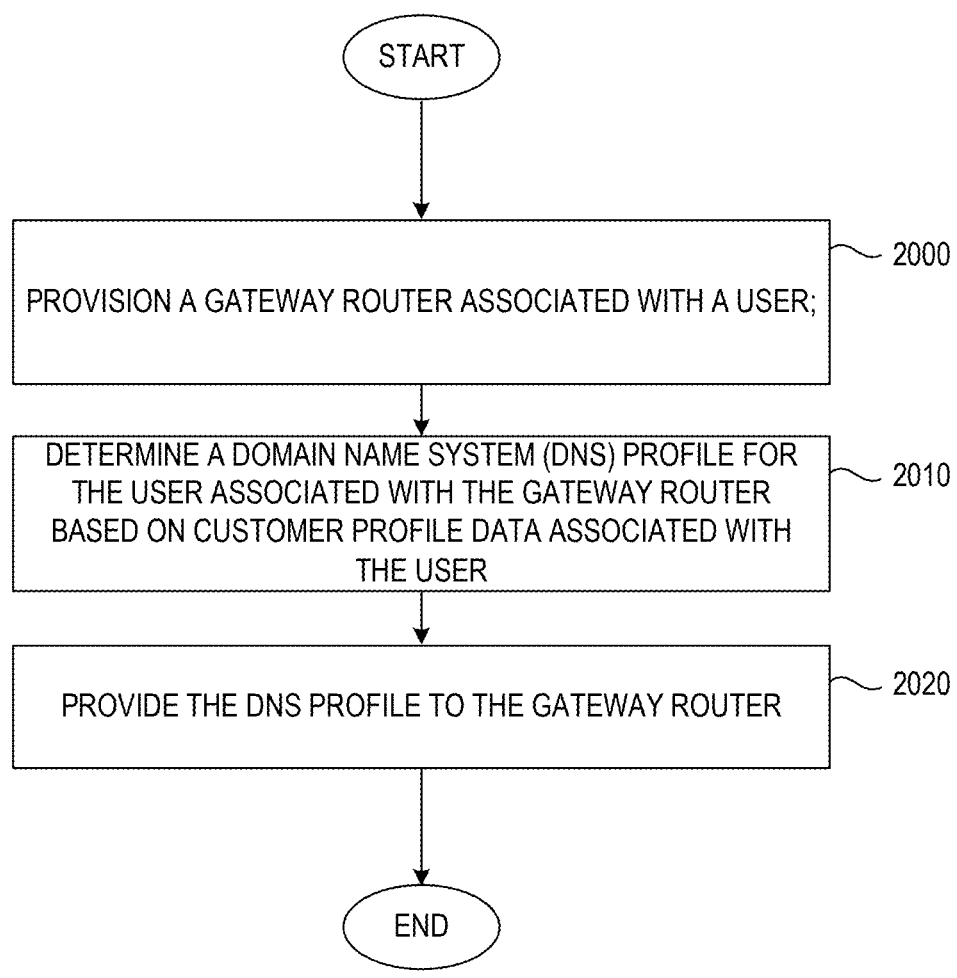
FIG. 5 is a flowchart of a method for providing a domain name system (DNS) profile to a user of a gateway router according to one implementation.

FIG. 5 is a flowchart of an example method for providing a domain name system (DNS) profile to a user of a gateway router according to one implementation of the present disclosure. FIG. 5 will be discussed in conjunction with FIG. 1. The service provider computing system 26, which includes one or more computing devices (e.g., computing devices 34-1-34-N, DNS server 52, DHCP server 54, NTP server 56, etc.), provisions the gateway router 42 associated with the user (FIG. 5, block 2000). The service provider computing system 26 determines a domain name system (DNS) profile, such as DNS profile 58-1, for the user associated with the gateway router 42 based on customer profile data 60 associated with the user (FIG. 5, block 2010). As described above, the DNS profile 58-1 includes a predicted fully qualified domain name (FQDN) 68-1. The service provider computing system 26 provides the DNS profile 58-1 to the gateway router 42 (FIG. 5, block 2020).

Figure 6:
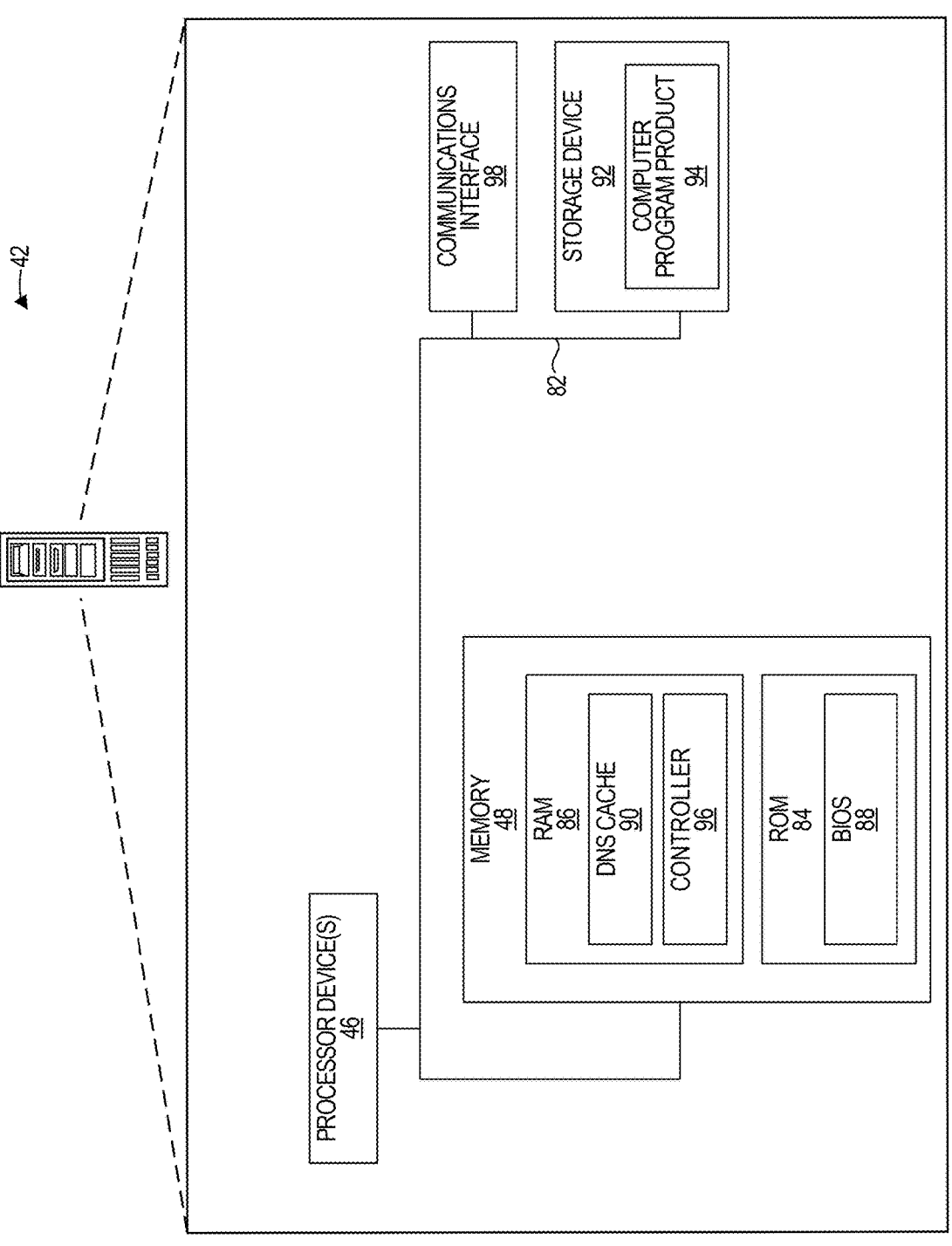
FIG. 6 is a block diagram of a gateway router suitable for implementing examples disclosed herein.

FIG. 6 is a block diagram of the gateway router 42 suitable for implementing examples disclosed herein. The gateway router 42 is associated with, and implements, the LAN 40. The gateway router 42 is operable to provide layer 3 connectivity to other networks for client computing device operating on the LAN 40 (e.g., client devices 44-1-44-N). The gateway router 42 includes the processor device(s) 46, a system memory (e.g., memory 48), and a system bus 82. The system bus 82 provides an interface for system components including, but not limited to, the memory 48 and the processor device(s) 46. The processor device(s) 46 may be any commercially available or proprietary processor.

The system bus 82 may be any of several types of bus structures that may further interconnect to a memory bus (with or without a memory controller), a peripheral bus, and/or a local bus using any of a variety of commercially available bus architectures. The memory 48 may include non-volatile memory 84 (e.g., read-only memory (ROM), erasable programmable read-only memory (EPROM), electrically erasable programmable read-only memory (EE-PROM), etc.), and volatile memory 86 (e.g., random-access memory (RAM)). A basic input/output system (BIOS) 88 may be stored in the non-volatile memory 84 and may include the basic routines that help to transfer information between elements within the gateway router 42. The volatile memory 86 may also include a high-speed RAM, such as static RAM, for caching data. In some implementations, the volatile memory 86 includes a DNS cache 90.

The gateway router 42 may further include or be coupled to a non-transitory computer-readable storage medium such as a storage device 92, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 92 and other drives associated with computer-readable media and computer-usable media may provide non-volatile storage of data, data structures, computer-executable instructions, and the like.

A number of modules can be stored in the storage device 92 and in the volatile memory 86, including an operating system and one or more program modules, which may implement the functionality described herein in whole or in part. All or a portion of the examples may be implemented as a computer program product 94 stored on a transitory or non-transitory computer-usable or computer-readable storage medium, such as the storage device 92, which includes complex programming instructions, such as complex computer-readable program code, to cause the processor device (s) 46 to carry out the steps described herein. Thus, the computer-readable program code may comprise software instructions for implementing the functionality of the examples described herein when executed on the processor device(s) 46. The processor device(s) 46, in conjunction with the controller 96 in the volatile memory 86, may serve as a controller, or control system, for the gateway router 42 that is to implement the functionality described herein.

The gateway router 42 may also include a number of communication interfaces, such as a communications interface 98, that are suitable for communicating with a network (or devices connected thereto) as appropriate or desired. For instance, the gateway router 42 may facilitate communication between a client computing device (e.g., client devices 44-1-44-N) operating on the LAN 40 and other networks, such as a wide area network (WAN) (e.g., network 80), the service provider network 22, and/or the like.

Individuals will recognize improvements and modifications to the preferred examples of the disclosure. All such improvements and modifications are considered within the scope of the concepts disclosed herein and the claims that follow.

What is claimed is:

1. A method, comprising:
during an initialization process of a gateway router, receiving, by the gateway router from a service provider computing system, a domain name system (DNS) profile associated with a user of the gateway router, the DNS profile comprising a predicted fully qualified domain name (FQDN), the predicted FQDN being determined based on customer profile data associated with the user;
querying, by the gateway router, a DNS service to obtain an internet protocol (IP) address corresponding to the predicted FQDN; and
storing, by the gateway router, the IP address corresponding to the predicted FQDN in a DNS cache of the gateway router.

2. The method of claim 1, wherein the DNS profile is received prior to the gateway router establishing a connection to any client computing device.

3. The method of claim 1, wherein receiving the DNS profile associated with the user comprises:
during the initialization process, obtaining, by the gateway router from the service provider computing system, an IP address for the gateway router;
connecting, by the gateway router, to a service provider network associated with the service provider computing system; and
obtaining, by the gateway router, the DNS profile associated with the user.

4. The method of claim 1, wherein querying the DNS service to obtain the IP address corresponding to the predicted FQDN comprises:
in response to receiving the DNS profile associated with the user, providing, by the gateway router to a DNS server of the service provider computing system, a DNS lookup request for the predicted FQDN; and
subsequent to providing the DNS lookup request, receiving, by the gateway router from the DNS server, the IP address corresponding to the predicted FQDN.

5. The method of claim 1, further comprising:
subsequent to storing the IP address corresponding to the predicted FQDN in the DNS cache, implementing, by the gateway router, a local area network (LAN); and
facilitating, by the gateway router, a connection between a client computing device on the LAN and a wide area network (WAN),
wherein the client computing device is associated with the user.

6. The method of claim 5, further comprising:
subsequent to implementing the LAN, receiving, by the gateway router from the client computing device, a resource request associated with a web-browsing transaction initiated by the user, the resource request comprising a uniform resource locator (URL) address;
determining, by the gateway router, the URL address corresponds to the IP address corresponding to the predicted FQDN that is stored in the DNS cache of the gateway router; and
providing, by the gateway router to the client computing device, an IP address corresponding to the URL address to resolve the web-browsing transaction without querying the DNS service.

7. The method of claim 5, further comprising:
subsequent to implementing the LAN, receiving, by the gateway router from the client computing device, a resource request associated with a web-browsing transaction initiated by the user, the resource request comprising a uniform resource locator (URL) address;
determining, by the gateway router, the URL address does not correspond to the IP address corresponding to the predicted FQDN that is stored in the DNS cache of the gateway router;
querying, by the gateway router, the DNS service to obtain an IP address corresponding to the URL address; and
providing, by the gateway router to the client computing device, the IP address corresponding to the URL address to resolve the web-browsing transaction.

8. The method of claim 7, further comprising:
storing, by the gateway router, a FQDN associated with the URL address in the DNS cache; and
subsequent to storing the FQDN associated with the URL address in the DNS cache, providing, by the gateway router, feedback data to the service provider computing system, the feedback data comprising the FQDN associated with the URL address.

9. The method of claim 1, wherein the DNS profile associated with the user comprises a plurality of predicted FQDNs.

10. A gateway router, comprising:

a memory; and one or more processors operable to:

during an initialization process, receive, from a service provider computing system, a domain name system (DNS) profile associated with a user of the gateway router, the DNS profile comprising a predicted fully qualified domain name (FQDN), the predicted FQDN being determined based on customer profile data associated with the user;

query a DNS service to obtain an internet protocol (IP) address corresponding to the predicted FQDN; and store the IP address corresponding to the predicted FQDN in the memory.

11. The gateway router of claim 10, wherein the gateway router is operable to provide layer 3 connectivity to a client computing device operating on a local area network (LAN) implemented by the gateway router.

12. The gateway router of claim 11, wherein the one or more processors are further operable to:

subsequent to storing the IP address corresponding to the predicted FQDN in the memory, receive, from the client computing device, a resource request associated with a web-browsing transaction initiated by the user, the resource request comprising a uniform resource locator (URL) address;

determine the URL address corresponds to the IP address corresponding to the predicted FQDN that is stored in the memory; and provide, to the client computing device, an IP address corresponding to the URL address to resolve the web-browsing transaction without querying the DNS service.

13. The gateway router of claim 11, wherein the one or more processors are further operable to:

subsequent to storing the IP address corresponding to the predicted FQDN in the memory, receive, from the client computing device, a resource request associated with a web-browsing transaction initiated by the user, the resource request comprising a uniform resource locator (URL) address;

determine the URL address does not correspond to the IP address corresponding to the predicted FQDN that is stored in the memory;

query the DNS service to obtain an IP address corresponding to the URL address; and provide, to the client computing device, the IP address corresponding to the URL address to resolve the web-browsing transaction.

14. The gateway router of claim 10, wherein the DNS profile associated with the user comprises a plurality of predicted FQDNs.

15. A method, comprising:

provisioning, by a service provider computing system comprising one or more computing devices, a gateway router associated with a user;

determining, by the service provider computing system, a domain name system (DNS) profile for the user associated with the gateway router based on customer profile data associated with the user, the DNS profile comprising a predicted fully qualified domain name (FQDN); and providing, by the service provider computing system, the DNS profile to the gateway router.

16. The method of claim 15, wherein determining the DNS profile for the user comprises:

providing, by the service provider computing system, the customer profile data associated with the user of the gateway router to a machine-learned model of the service provider computing system;

determining, by the service provider computing system, a plurality of predicted FQDNs for the user based on an output of the machine-learned model; and determining, by the service provider computing system, the DNS profile for the user, the DNS profile comprising the plurality of predicted FQDNs.

17. The method of claim 15, wherein providing the DNS profile to the gateway router comprises:

receiving, by the service provider computing system from the gateway router, a DNS profile request; and in response to receiving the DNS profile request, providing, by the service provider computing system to the gateway router, the DNS profile for the user.

18. The method of claim 15, wherein the user is a first user and the gateway router is a first gateway router, and wherein determining the DNS profile for the user comprises:

determining, by the service provider computing system, the DNS profile for the first user of the first gateway router;

subsequent to determining the DNS profile for the first user, receiving, by the service provider computing system from a second gateway router, feedback data comprising a plurality of FQDNs corresponding to a plurality of web-browsing transactions initiated by a second user associated with the second gateway router;

determining, by the service provider computing system, customer profile data associated with the second user matches the customer profile data associated with the first user; and determining, by the service provider computing system, an updated DNS profile for the first user based on the customer profile data associated with the first user and the feedback data.

19. The method of claim 15, further comprising:

subsequent to providing the DNS profile to the gateway router, receiving, by the service provider computing system from the gateway router, a DNS lookup request corresponding to a web-browsing transaction initiated by the user;

in response to receiving the DNS lookup request from the gateway router, providing, by the service provider computing system to the gateway router, an IP address corresponding to the DNS lookup request;

subsequent to providing the IP address corresponding to the DNS lookup request, receiving, by the service provider computing system from the gateway router, feedback data comprising a FQDN associated with the DNS lookup request; and training, by the service provider computing system, a machine-learned model of the service provider computing system with the feedback data, the machine-learned model operable to generate DNS profiles for a plurality of users of a plurality of gateway routers associated with the service provider computing system.

20. The method of claim 15, wherein the customer profile data comprises one or more of:

demographic data associated with the user; or geographic data associated with a premises serviced by the gateway router.

* * * * *